United States Patent [19]

Bornhorst et al.

[11] Patent Number: 5,282,121
[45] Date of Patent: Jan. 25, 1994

[54] HIGH INTENSITY LIGHTING PROJECTORS

[75] Inventors: James M. Bornhorst, DeSoto; Timothy D. Stacy, Rowlett; Richard W. Hutton, Irving, all of Tex.

[73] Assignee: Vari-Lite, Inc., Dallas, Tex.

[21] Appl. No.: 693,366

[22] Filed: Apr. 30, 1991

[51] Int. Cl.$^5$ ............................................. F21V 29/00
[52] U.S. Cl. ................................. 362/294; 362/293; 362/268; 362/318; 353/54
[58] Field of Search .............. 353/30, 31, 54, 55; 359/51, 52, 66; 362/293, 294, 268, 318; 340/784

[56] References Cited

U.S. PATENT DOCUMENTS

| | | | |
|---|---|---|---|
| 3,626,176 | 12/1971 | Tsugami | 353/54 X |
| 3,628,601 | 12/1971 | Snaper et al. | 165/47 |
| 3,750,136 | 7/1973 | Roess | 340/336 X |
| 4,222,641 | 9/1980 | Stolov | 353/84 |
| 4,240,133 | 12/1980 | Haina et al. | 362/293 |
| 4,315,186 | 2/1982 | Hirano et al. | 313/111 |
| 4,388,642 | 6/1983 | Reno, Jr. et al. | 358/60 |
| 4,389,096 | 6/1983 | Hori et al. | 358/237 X |
| 4,435,047 | 3/1984 | Fergason | 428/1 X |
| 4,495,549 | 1/1985 | Carlson et al. | 362/62 |
| 4,602,321 | 7/1986 | Bornhorst | 362/268 |
| 4,613,207 | 9/1986 | Fergason | 359/41 |
| 4,647,966 | 3/1987 | Phillips et al. | 358/88 |
| 4,671,618 | 6/1987 | Wu et al. | 359/52 |
| 4,673,255 | 6/1987 | West et al. | 352/31 X |
| 4,687,301 | 8/1987 | Ledebuhr | 353/31 X |
| 4,688,900 | 8/1987 | Doane et al. | 359/52 |
| 4,690,526 | 9/1987 | Ledebuhr | 353/31 |
| 4,693,557 | 9/1987 | Fergason | 359/41 |
| 4,722,593 | 2/1988 | Shimazaki | 353/122 |
| 4,739,396 | 4/1988 | Hyatt | 358/60 |
| 4,749,259 | 6/1988 | Ledebuhr | 353/33 X |
| 4,763,993 | 8/1988 | Vogeley et al. | 359/70 |
| 4,772,098 | 9/1988 | Ogawa | 353/54 X |
| 4,818,074 | 4/1989 | Yokoi et al. | 359/40 |
| 4,824,210 | 4/1989 | Shimzaki | 353/122 X |
| 4,824,214 | 4/1989 | Ledebuhr | 353/31 X |
| 4,836,649 | 6/9189 | Ledebuhr et al. | 353/31 X |
| 4,843,529 | 6/1989 | Izenour | 362/284 |
| 4,890,208 | 12/1989 | Izenour | 362/294 |
| 4,891,738 | 1/1990 | Richardson et al. | 362/282 |
| 4,971,436 | 11/1990 | Aoki et al. | 353/31 |
| 4,974,133 | 11/1990 | Fujiki | 362/283 |
| 5,016,984 | 5/1991 | Fergason | 353/122 X |
| 5,040,877 | 8/1991 | Blinc et al. | 359/63 |
| 5,044,730 | 9/1991 | LaDuke et al. | 359/890 |
| 5,045,983 | 3/1991 | Shields | 362/293 |

OTHER PUBLICATIONS

"Design of a Microprocessor Controlled Theater Lighting Instrument" by Jack Wentz (Thesis, Lehigh University 1985).
"Liquid Crystal Display" by Paul S. Drzaic, published in *Information Display*, vol. 6, No. 12, Dec., 1990.
"Projection Displays: A New Wave for the Next Decade" by Dr. Tuckerman Moss, published in *Photonics Spectra*, Aug. 1990.
"New Nematic-Cholesteric LCD Using Hysteresis Behavior" by A. Mochizuki et al. Proceedings of the SID, vol. 26, No. 4, p. 243 (1985).

*Primary Examiner*—Stephen F. Husar
*Attorney, Agent, or Firm*—Morgan & Finnegan

[57] ABSTRACT

A high intensity light projector for stage, architectural and similar applications includes a controllable image quality projection gate providing advanced visual effects. The projection gate, capable of selectively scattering or transmitting incident light, may be constructed of an array of scattering liquid crystal material in combination with infrared and ultraviolet reduction means which provide in the high intensity beam, a stable thermal environment by minimizing the absorption of light by the projection gate. Additional thermal efficiency is provided by supplemental cooling means. Color control is also provided in the form of dichroic filter wheels forming cooperating adjustable low, high and band width filters including saturation control. A color measuring feedback sensor is also provided. An intensity measuring feedback sensor controls a spatially-modulated, variable-density, reflectively-coated dimming wheel. A programmable gobo system has provisions for gobo selection, orientation, and rotation.

32 Claims, 11 Drawing Sheets

HIGH INTENSITY LIGHTING PROJECTORS

BACKGROUND

1. Field of Invention

The present invention relates to light projectors used for various illumination and lighting applications and in particular to projectors that are used to obtain visual effects, light pattern generation and projection in stage illumination and in architectural, display and similar applications.

2. Discussion of Prior Art

Lighting projectors, e.g., those used in stage lighting, are typically equipped with one or more control devices for controlling intensity or focusing or dimensioning the beam, changing its color, or changing the beam's direction. Modern multiple parameter (automated) projectors include controls for all of these parameters and more.

Although such projectors perform effectively in many applications, they suffer from a number of limitations which, if overcome, could greatly expand the visual effects achievable by the lighting instruments and extend their utility to other environments. To achieve such advances, improvements are required in the beam forming mechanism, in the projection of patterns, in the management of heat associated with the light source, in the control of beam color, and in the noise levels which derive from present cooling techniques. To be effective, these improvements must function in a densely packed, compact and sometimes highly mobile structure housing both very fragile optical and electronic components together with a light source capable of producing oven-like temperatures. (An exemplary application involving a nominal image size of 10 ft. by 10 ft. (100 square feet) calls for brightness in the neighborhood of 100 foot candles thus requiring the projector to produce about 10,000 Lumens.) Moreover, certain types of lighting instruments go on "tour" and must withstand truck transport abuses and the vagaries of the weather.

A number of lighting control applications call for controllable beam shapes and patterns. Performance lighting in stage productions, for example, often requires a variety of different beam patterns and/or shapes. For this purpose, a projection gate is often used to form the desired image across the beam of light. Typically, the projection gates are embodied as shutters or etched masks that function like stencils in the beam path to project a particular beam configuration. Known arrangements, "gobos" for example, often include rotary assemblies that incorporate several pattern generating elements encircling the axis of rotation, along with a drive mechanism for rotating a selected pattern into the beam path.

In such arrangements only a limited number of patterns are available, there is no grey scale, and resolution is also limited. Another inherent limitation in this type of system, associated with its dependence on physical motion, is the rapidity with which a desired pattern can be selected and implemented.

Arrays of liquid crystal pixels are potentially useful as projection gates because of their electro-optic effect, and because a virtually unlimited number of high resolution images may theoretically be synthesized quickly and easily.

Such liquid crystal arrays can be used to create images by selectively placing each individual pixel of the array in a relaxed (light blocking) state, or in an aligned (light transmitting) state, or in a state intermediate between the two extreme positions according to a "grey scale". Selection of a grey level may be obtained by controlling the voltage or other control stimuli that is applied to the pixel, thus controlling the alignment or transmissivity of the associated liquid crystals. Over certain ranges there is a predictable relationship between the applied control stimulus and the extent of alignment among the liquid crystals in the pixels, thus providing grey scale control. Whether used in this manner or in a two-state, on-off mode, pixellated liquid crystal arrays have the potential to be used in a "light valve" capacity to create a complete picture across a beam of light.

Pixels in an array of liquid crystals may be relatively densely packed thus offering opportunities for higher resolution and transmission efficiency. Also, they may be individually controlled by a addressing scheme capable of selectively placing each pixel of the array in a desired state. Thus a virtually limitless range of images may be rapidly varied. In many applications pixels are arranged in a row and column configuration and activated by applying a potential to a particular control element associated with each of the pixels. Alternatively, a multiplex or other addressing scheme can be employed to reduce the number of elements necessary to address the pixels. Both active and passive matrices may be utilized.

Certain types of liquid crystal arrays have been previously used with some success in image projection applications. Arrays of twisted nematic liquid crystal (TNLC) have been used and have provided several advantages over other image forming techniques. However, TNLC devices typically require pre-polarization of incident light. Since a polarizer has to be placed in the optical path to polarize the light before it reaches the TNLC gate, there is a loss of intensity of more than fifty percent before it even reaches the array. In high intensity projectors for stage lighting and the like, this loss is far beyond acceptable levels.

There have been efforts to address the light loss problem. An improved method of illuminating a TNLC light valve with linearly polarized light is discussed in "Large-screen Projection Displays II" by William P. Bleha, Jr. (*S.P.I.E. Vol.* 1255, 1990). The disclosed method for converting unpolarized light into linearly polarized light is said to double the intensity realized by conventional polarizers.

The disclosed polarization method uses a polarization convertor consisting of a polarizing beam splitter, a polarization direction rotator and a synthesizer to significantly improve the illumination efficiency. The polarizing beam splitter separates the incident light into two mutually perpendicular linearly polarized beams (transmitted p-polarized light and reflected s-polarized light). The polarization direction rotator effectively recaptures much of the light that was lost in previous polarizing systems by rotating the polarization direction of the p-polarized light ninety degrees to equalize both polarization directions. Thereafter, the two components of the light are combined on the liquid crystal by the synthesizer.

The polarization convertor may ultimately provide a conversion efficiency approaching 100%. However, reflection and absorption losses in the polarization convertor components, plus the losses in the contrast-enhancing sheet polarizer, presently result in an overall 20% loss of intensity as the unpolarized light is converted to a linearly polarized beam.

There are other formidable barriers in addition to excessive light loss. Conventional polarizers typically associated with liquid crystal arrays lose light intensity through an absorption process. Unfortunately, absorption converts light energy into heat causing the temperature of the gate and surrounding optics to rise to intolerable levels. In performance and display applications, where projector temperatures can reach combustible levels, this process of heat absorption causes a thermal buildup which would greatly exceed the temperature limits of the liquid crystal array.

Various cooling techniques have been proposed which have attempted to alleviate the destructive thermal effects of radiant energy absorption. U.S. Pat. No. 4,739,396 to Gilbert Hyatt, particularly columns 50 through 62 of this patent, discusses numerous cooling techniques which have been proposed for use in light projectors. See also U.S. Pat. No. 4,763,993 issued to James H. Vogeley, et al.

Cooling by forced air is thought to be effective in some applications because it is theoretically transparent to incident light and does not reduce the amount of transmission. Unfortunately however, heat dissipation techniques which depend on fan operation and other forced air cooling techniques can create noise levels which make this technique unacceptable for many performance and display applications. Air cooling also exposes optical elements to atmospheric contaminants which can compromise optical clarity and cause other problems.

Other heat control arrangements for use in lamp environments are known which might serve to protect a liquid crystal gate. For example, improvements in the maintenance of a stable thermal environment in stage projectors have also been proposed by providing a heat exchanger that circulates a cooled fluid through a component of the lamp system for additional cooling. The cooled fluid acts in a heat sink capacity to absorb heat and conduct it away from the heat intolerant devices.

These and related techniques for improving the thermal environment of an optical projector system have been described by George Izenour in U.S. Pat. Nos. 4,843,529 and 4,890,208. In those references, a multilayer dielectric interference filter, otherwise known as a dichroic "hot mirror", and a liquid cell are placed in the light path between the light source and the mechanical projection gate to remove energy in the infrared region from the beam of light. The hot mirror aids the process of infrared filtering by reflecting "near" infrared energy having wavelengths in the range of about 700 to 1500 nanometers while passing light in other regions. The water in the liquid cell is effective in absorbing the "far" infrared energy in the 1.5 to 10 micrometer region that is not reflected by the dichroic filter. The water cell is effective because it displays good transmission characteristics for energy having shorter wavelengths (i.e., visible light).

The combination of the infrared-absorbing liquid cell and the infrared-reflecting "hot mirror" removes infrared radiation from the beam before it reaches the projection gobo. This process reduces the heating effects of the infrared energy and results in an overall increase in the temperature stability of the optical apparatus.

These and other methods of cooling which can include combinations of radiation, convection, and conduction have been employed in reducing the heating effects in some lighting applications. However, the practical utility of these techniques to protect heat absorbing, temperature sensitive liquid crystal light valves in the oven-like environment of a high-intensity projector, has not been demonstrated.

Because of these environmental obstacles and the loss of substantial light through the use of polarizers, the full potential of liquid crystal optics in the projection fields of interest has not heretofore been realized.

A second class of liquid crystal devices is available which will scatter, rather than absorb incident light while in a blocking mode. These scattering liquid crystal arrays thus offer the potential for use in high-intensity projectors having high heat environments.

Descriptions of liquid crystal devices that will scatter incident light are found in U.S. Pat. No. 4,671,618 to Wu et al. and U.S. Pat. No. 4,688,900 to Doane et al. These patents disclose the us of Polymer Dispersed Liquid Crystal (PDLC) arrays which are essentially microdroplets of nematic liquid crystals dispersed in a polymer matrix. The PDLC material is formed by a process known as phase separation. This type of device will scatter incident light when the light encounters a mismatch between the indices of refraction at the media boundaries that are encountered by the light traveling through the matrix. This occurs when the liquid crystals are in a non-aligned state; the mismatch at the boundary of the polymer matrix and liquid crystal material causes the incident light to be reflected, refracted, and thereby scattered.

A similar type of scattering material is described in U.S. Pat. No. 4,435,047, to James L. Fergason, which discloses a liquid crystal material encapsulated in a containment medium. This device allows for transmission of incident light when the indices of refraction are matched and the liquid crystals in the capsules are in an ordered alignment. Scattering or absorption of incident light results from the mismatch of the indices of refraction and the distorted or curvilinear alignment of the liquid crystals in the containment medium.

When light-scattering liquid crystals are placed in an ordered state, e.g., by application of an electric field, the incident light traveling in a direction parallel to the electric field will encounter a virtual match between the indices of refraction at the interface of the liquid crystals and the matrix. The matched indices allow for unimpeded transmission of the incident light in this ordered state. (Thermal, magnetic, optic and other energy sources may also serve to control the alignment of the liquid crystals in an array.) Over a range, the degree of transmission is proportional to the intensity of the applied field, thus affording a grey scale mode of operation.

In addition to offering the ability to scatter rather than absorb incident light, light scattering gates offer the vitally important property of not requiring prepolarization of the light incident upon the projection gate. This eliminates a light intensity loss which is prohibitive for many applications.

Although there is reduced absorption of light in the visible region, the absorption characteristics for these light scattering gates are not as favorable at longer wavelengths. They are thus subject to thermal damage from absorption of infrared energy in the high-intensity environment of certain projectors. Accordingly, unless provided with an effective cooling technique, the resolution, speed and image forming abilities of scattering liquid crystal arrays can not be exploited in the environment of high-intensity production lighting devices.

It is accordingly an object of the invention to provide a thermally protected lighting projector gate having the resolution, programmability and response time of a liquid crystal array.

It is a further object of the invention to provide a light projection system which exploits the considerable advantages of light-scattering liquid crystal arrays while protecting such arrays from heat damage.

It is a further object of the invention to provide precise beam pattern control for use in lighting and animation applications by utilizing a dynamically variable projection gate with a diverse assortment of patterns for high speed image projection.

Yet another object of the invention is to provide improved projector cooling techniques that provide more stable thermal environments thereby permitting a broader range of beam control devices to be used in high intensity light projectors. Improved cooling to minimize the potential discomfort that is ordinarily experienced by a performer under bright lights is another object.

A further object of the invention is to create innovative and unusual visual lighting effects by jointly and individually utilizing a dynamically variable liquid crystal projection gate and a gobo unit.

An additional aim of the invention is to provide a lighting projector that operates in a closed environment, thereby improving reliability, decreasing the risk of contamination and reducing the noise emanating from the system.

Another goal of the invention is to provide color control assemblies capable of controlling color parameters in a graduated manner in order to accommodate the special characteristics of human color perception.

A further object of the invention is to provide improved color control systems employing feedback supplied by a beam spectrum sensor.

It is another object of the invention to provide improved gobo utilization including a wider range of effects incorporating both static and dynamic patterns.

Another object of the invention is to provide improved dimming means coupled with an intensity level feedback sensor.

Other objects and advantages of the invention will become apparent in the description which follows.

SUMMARY OF THE INVENTION

Generally, one aspect of the invention comprises a light projection system for lighting applications having one or more light projectors which include image forming means, at least one of the projectors comprising: (1) a light beam source for generating a beam having an intensity suitable for lighting applications; (2) a projection gate located to modulate the beam and having an addressable array of light-scattering liquid crystal pixels capable of assuming transparent and opaque states; (3) a heat management system for protecting the array of liquid crystals from the heat generated by the beam; and (4) a source of image control signals connected to the array to control the states of the pixels to vary the image projected by the beam.

Another aspect of the invention features an image projection system comprising: (1) a light beam source for generating a beam; (2) a beam modulation system including an addressable array of light scattering liquid crystal pixels capable of assuming transparent and opaque states; (3) a heat sink for the array comprising a liquid cell in thermally conductive relationship to the array; and (4) a source of image control signals connected to the array to control the states of the pixels to thereby vary the image projected by said beam.

Yet another aspect of the invention relates to color control and contemplates a light projection system for lighting applications having one or more light projectors which include beam color control means, the projectors comprising: (1) a light beam source for generating a beam having an intensity suitable for lighting applications; (2) a set of color filter elements transposable relative to the beam; and (3) certain of the color filter elements comprising variable dichroic filtering materials configured such that filter cutoff and cut-on wavelengths are adjustable by positioning said elements.

In one form the filter elements are circular elements in which the hue parameters vary circumferentially and saturation varies in the radial direction. Thus rotation through the beam varies hue while orthogonal movement laterally of the beam axis effects saturation control.

According to a further feature of the invention, the color control system includes a color responsive feedback element such as a linearly variable band pass filter functioning as a spectrum analyzer which in conjunction with a photodiode array or other suitable transducer, measures beam color and supplies accurate color measurement signals to a color controller. This permits precise color matching among luminaires.

According to another aspect of the invention, gobo selecting means are combined with gobo orientation control means to produce a selection of gobo effects involving both programmably oriented static patterns and the dynamic rotation of those patterns.

According to a further aspect of the invention, an intensity control system includes an intensity feedback transducer, and a dimming wheel having a spatially-modulated, variable-density, reflective coating applied thereon, cooperating with a local control system to produce specified output intensity levels.

BRIEF DESCRIPTION OF DRAWINGS

A more complete understanding of the present invention may be had by reference to the following Detailed Description with the accompanying drawings, wherein.

DETAILED DESCRIPTION OF PREFERRED EMBODIMENTS

Figure 1:
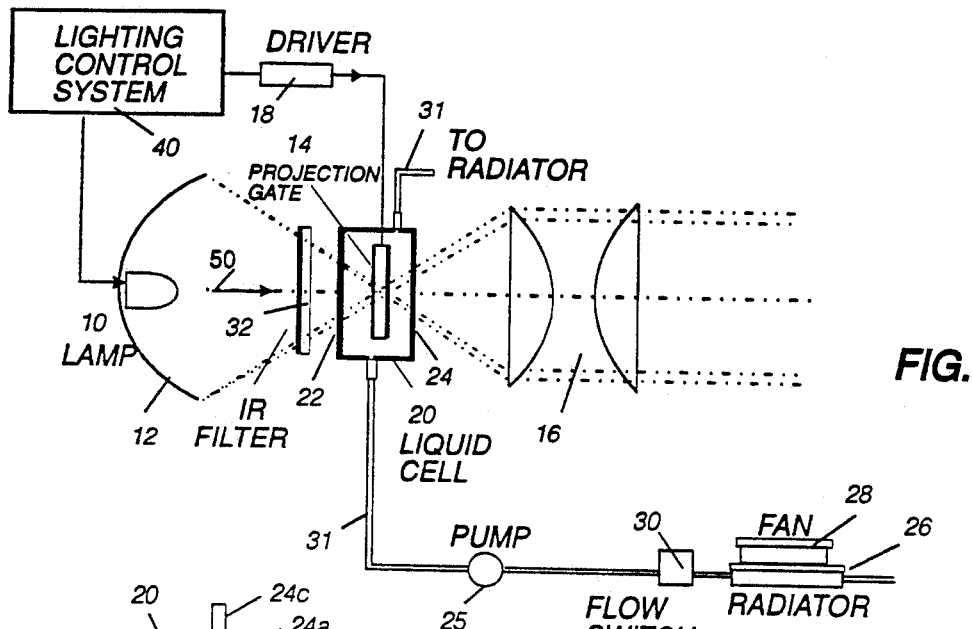
FIG. 1 is a schematic side elevation view of the interior of a light projector showing certain features of the invention.

As shown in FIG. 1, a light projector system includes a lamp 10 and a reflector 12 that cooperate to focus a beam of light 50 upon a programmable light pattern generator or projection gate 14 containing a liquid crystal array and immersed in a filter/coolant liquid cell 20. The light source 10, e.g., a high intensity, 1000 Watt arc lamp, emits radiant energy over a band including visible, infrared, and ultraviolet which is then collected by the reflector 12 and directed as a beam of unpolarized focused light 50 to the programmable image generator 14.

The pixels of the latter are energized via a driver 18 which is controlled in turn by the lighting control system 40 which may be of the type shown in U.S. Pat. No. 4,980,806 to Taylor et al., incorporated herein by reference.

To filter energy in the "near" infrared region (having wavelengths between visible light and "far" infrared) before those wavelengths reach the sensitive projection gate 14, a multi-layer dielectric interference filter 32 may be placed between the projection gate 14 and lamp 10. The filter 32 incorporates an optical thin film exhibiting dichroic properties that are chosen to reflect near-infrared while transmitting the shorter, visible wavelengths.

A lens system such as 16 is provided to collect the light that is transmitted straight through, and modulated by, the gate 14 and to project the resultant image.

PROJECTION GATE

The programmable light pattern generator 14 is comprised of an array of liquid crystal pixels capable of scattering light in one mode and transmitting light in another mode. One type of scattering material suitable for such an array is nematic liquid crystals dispersed in a polymer matrix. The resultant is referred to as Polymer-Dispersed Liquid Crystals (PDLC). Nematic curvilinear aligned phase (NCAP) liquid crystals, liquid crystal polymer composites (LCPC), nematic-cholesteric liquid crystal diplays (NC-LCD), and polymer network liquid crystal displays (PN-LCD) would also be suitable. Also, a TN system that reduces ir susceptibility and polarization losses sufficiently, and employs LC systems with appropriate properties, may suffice for some applications.

Pixel elements comprised of nematic liquid crystals dispersed in a polymer film can be individually driven to one of several states. In one state, light incident at a narrow angle about the perpendicular will be transmitted through the pixel element, and will then be collected by the lens system 16 for projection. In another state, transmission of incident light is effectively prevented by utilizing the reflective and refractive properties of light traveling through interfaces with mismatched indices of refraction to scatter the incident light. A grey scale is obtained by placing the liquid crystals in intermediate states of alignment by control of the energizing signal, thus controlling the amount of transmissivity of light straight through the pixel.

Figure 2:
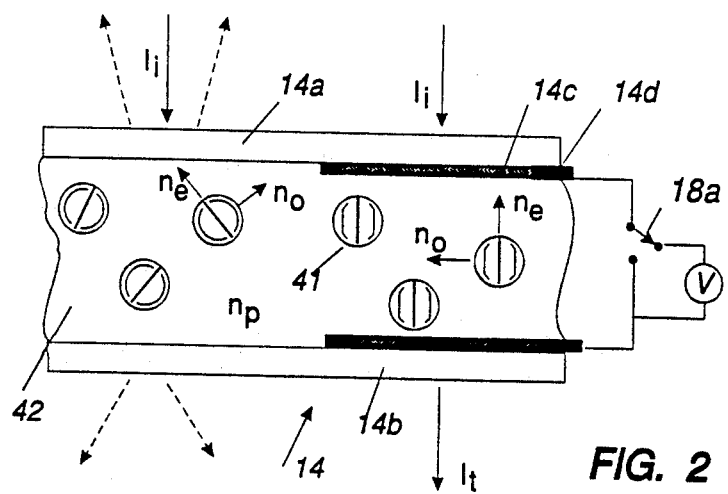
FIG. 2 is a schematic view of a portion of a liquid crystal array illustrating various states of liquid crystal droplets contained in a polymer matrix.
Figure 4:
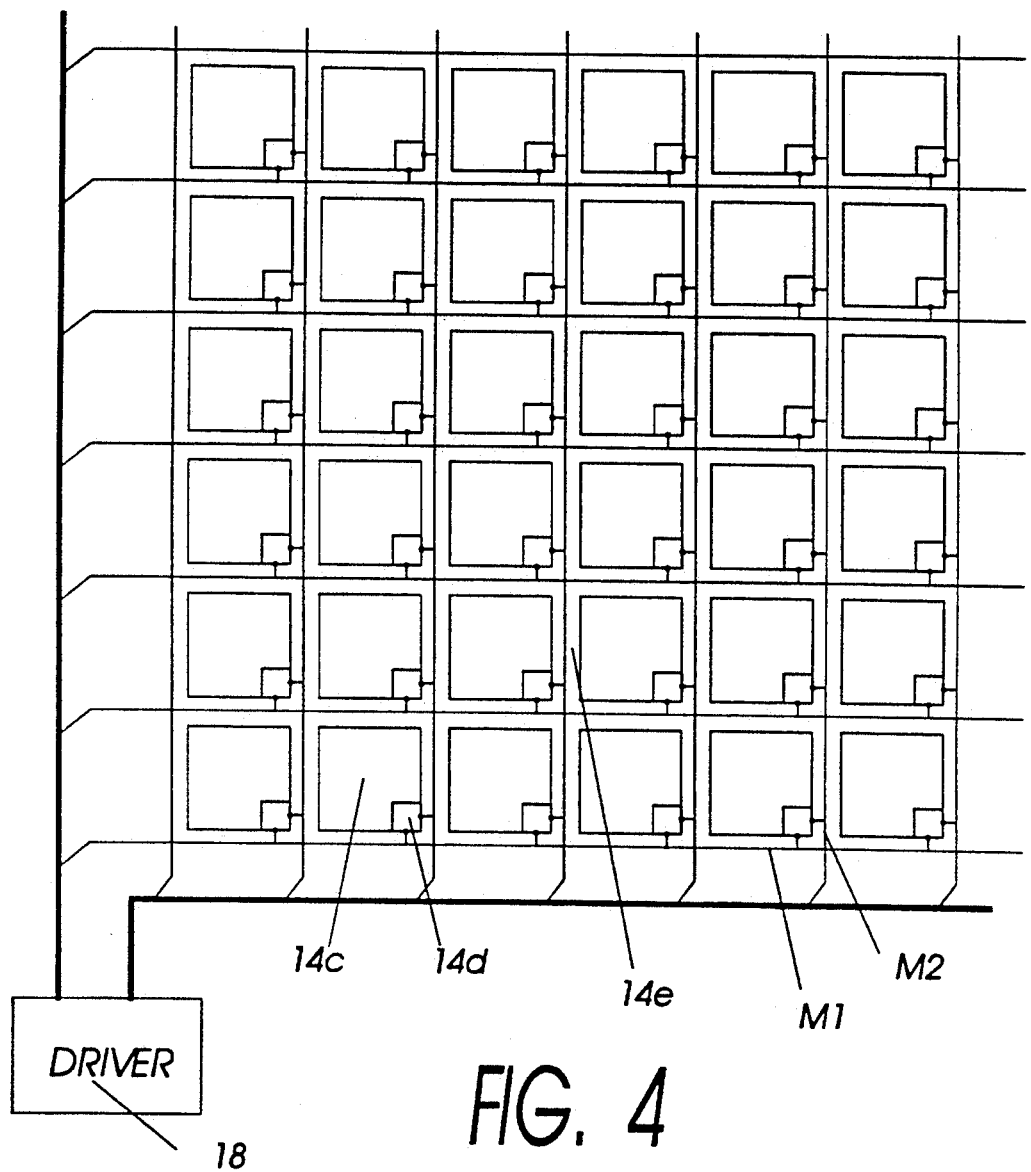
FIG. 4 is a schematic plan view of a programmable light-scattering, active-matrix projection gate for use in the systems of FIGS. 1 and 7.

As shown in FIG. 2, the gate array comprises liquid crystal droplets 41 dispersed in a polymer matrix 42, which is positioned between two transparent plates 14a and 14b, containing an active matrix 14e (FIG. 4). The control elements 14d, one for each pixel, each apply the proper drive voltage to its respective pixel 14c from a signal source V.

The liquid crystal materials used in PDLC arrays have two indices of refraction, measured along perpendicular axes. The extraordinary index of refraction, $n_e$, is measured along the liquid crystal's long axis, and the ordinary index of refraction, $n_o$, is measured along an axis perpendicular to the axis of $n_e$. Additionally, the polymer matrix containment medium has an index of refraction, $n_p$, that is matched to the extraordinary index of refraction, $n_e$. (In some cases $n_e$ is matched to $n_p$.) By controlling the relative values of these refractive indices, incident light $I_i$ may be transmitted or scattered depending upon whether the light encounters matched or mismatched indices of refraction as it travels through the interfaces of the polymer matrix/liquid crystal combination.

When in the transmissive state, (as schematically indicated on the right side of FIG. 2) more than 90 percent of the light that is incident upon the pixels will be transmitted at a narrow angle about the perpendicular.

Alternatively, when a pixel is placed in its light blocking or scattering state (as indicated on the left side of FIG. 2), the liquid crystals are in a random alignment and the extraordinary index of refraction, $n_e$, is no longer aligned in the direction of light propagation. The light will exit the projection gate in a random fashion with respect to the surface of the element as suggested by the dashed vectors, and is no longer a narrow focused beam; "straight-through" transmission thus is effectively prevented. It should also be noted that there is a significant amount of "back scattering" in addition to the expected "forward scattering".

Although over 90 percent of the light will pass through the pixels when they are in a scattering mode, it will not be collected for projection by the lens assembly 16 due to the wide scattering angles (both forward and reverse). Thus transmission of light is effectively and controllably reduced without utilizing an absorption process that would damage the projection gate.

For many applications, it is preferred to control the range of index matching in the pixels from an exact degree of matching to a maximum degree of mismatch. As a consequence, the light will be nearly completely transmitted in one state, partially transmitted in the intermediate states, and dispersed to such an extent in the off state as to put the pixel in an opaque condition.

In some applications it will be sufficient to operate the pixels in just the two end states, transparent and opaque, to provide an on-off mode.

It is preferable to design the gate to provide high contrast ratios, e.g., ratios of about 100:1 or greater.

The composition of the liquid crystal and polymer composite used in the projection gate 14 and the electrical characteristics of the active matrix control elements will determine the signal (amplitude, frequency and timing), and power requirements of the gate driver system used to vary pixel excitation over a range from transparent through opaque. The liquid crystal matrix must have the proper electrical characteristics so that the voltage drop occurs primarily across the liquid crystal material 41, rather than across the polymer matrix material 42. Active matrices are described in many patents and publications. See e.g., U.S. Pat. No. 4,818,981 to Oki et al.

Depending on the liquid crystal and polymer composite used in forming the array, the control parameters can establish that the picture elements are in a clear state having an ordered alignment (perpendicular transmissive mode) under normal conditions with no energy applied, and in an opaque state having a random alignment (oblique transmissive mode) with the application of the appropriate electrical signal; or vice versa. The former type of array is known as "reverse mode" and is particularly desirable in applications that require the liquid crystal material to return to a clear state when power is lost.

Some alternate ways of controlling the alignment of the pixels in an array include the use of thermal, magnetic or electro-magnetic (including optical) excitation as control stimuli. In particular applications, these methods may be suitable for incorporation as alternate embodiments in order to control the alignment of the liquid crystals.

To provide the appropriate control signal, the electronic driver circuit 18, FIGS. 1 and 4, typically receives a video signal from the lighting controller 40 and selectively energizes individual elements of the array in accordance with the input video pattern by selective application to the appropriate rows and columns, M1 and M2 (FIG. 4), respectively. As a consequence, the desired image is created across the projection gate 14 and modulates the light beam which is then collected and projected by the lens system 16.

Following the techniques taught in U.S. Pat. No. 4,980,806, video frames may be stored as cues, e.g., locally in the lamp, and supplied as directed to the gate to produce animated and real-time type imaging. A single frame can also be manipulated through processing to produce multiple variations. Alternatively, a video communication link can be employed to supply continuous video from a remote source.

The driver circuit 18 preferably accepts video signals that are represented by digital logic control signals, which are transmitted either serially or in parallel, and is typically designed as a microprocessor-compatible peripheral device meeting the interface requirements of the liquid crystal array 14.

Depending on the application, the gate elements may be arranged in various configurations, e.g., in a 100×100 element array containing 10,000 individual pixels and the associated electrical connections for application of the drive signal to each. Using a row and column matrix arrangement, 200 electrical connections could be used to access each of the pixels in a 100×100 element array by way of the associated active element. In this manner, the image data can be sent down the columns in order to activate the desired pixels activated row by row.

Active matrices are obtainable from Optical Imaging Systems of Troy, Mich. Specific driver designs will depend on the characteristics of the gate. For illustrative features see e.g., the drivers SED1180F, 1181F, 1190F and 1191F marketed by S-MOS Systems Inc. of San Jose, Calif.

In some cases, a matrix technique utilizing Plasma addressing ma be appropriate in lieu of conventional active-matrix addressing techniques thereby eliminating the need for control element 14d. Plasma addressing is described by Thomas S. Buzak in "A New Active-Matrix Technique Using Plasma Addressing" (*S.I.D. 90 Digest* pp. 420–423). The technique replaces the active matrix required to access each pixel with plasma-containing channels and offers a broad drive voltage range with means for accurately placing that voltage at a selected pixel. The broad voltage range provided by plasma addressing allows LC materials requiring a large drive voltage to be placed in a selected state according to the desired grey level.

Plasma addressing simplifies display fabrications by replacing the conventional TFT control elements (14d) with a selectively conductive channel of confined gas. The array is therefore comprised of drivers for accessing pixel columns, similar to a conventional addressing scheme, and a plasma channel for each row to latch the column video data. The transmissivity of an individual pixel is controlled by applying a data signal to the pixel by means of its column driver and by controlling the conductivity of the gas contained in the associated channel. Plasma, a highly conductive ionized gas, completes the electrical circuit between the data line and ground. Thus, the signal on the data column will only excite the liquid crystals in the pixel when the gas is in its conducting, plasma state.

A preferred embodiment of the present invention for high performance applications includes a 200×200 element PDLC array in an active matrix, the unit being configured as the projection gate of a light projector that is constructed as a three square inch "window". Where more modest imaging performance is acceptable, the gate may comprise an array of 35×35 pixels. Even with this reduced resolution, image variety and speed are markedly superior to mechanically controlled gobos.

For a more comprehensive description of PDLC technology see Liquid Crystals-Applications and Uses, Volume 1, edited by B. Bahadur and published by World Scientific Publishers, N.J., 1990. (A detailed discussion of PDLC technology is found in Chapter 14).

An informative description of PDLC materials and manufacturing processes useful in producing a preferred gate can also be found in U.S. Pat. No. 4,673,255 issued to Doane, West et al.

TEMPERATURE CONTROL

The operation of a projection array comprised of a liquid crystal and polymer composite is temperature dependent. Projection gates formed of this material, e.g., PDLC, offer maximum transmission only for a specific range of temperatures, so maintaining the projection gate within a stable operating temperature range is important.

The infrared and ultraviolet energy that would be absorbed by a light scattering LC gate from the beam of a high intensity light source such as 1000 watt arc lamp, is substantially greater than the LC material can tolerate. Accordingly, the projection unit shown in FIG. 1 includes a heat control system which incorporates infrared filtering control mechanisms 20, and 32 to mitigate the rise in temperature and thereby prevent thermal destruction of the optical elements. Filtering control mechanism 32 also serves to absorb ultraviolet energy that would chemically alter the liquid crystal display.

LIQUID CELL

Figure 3:
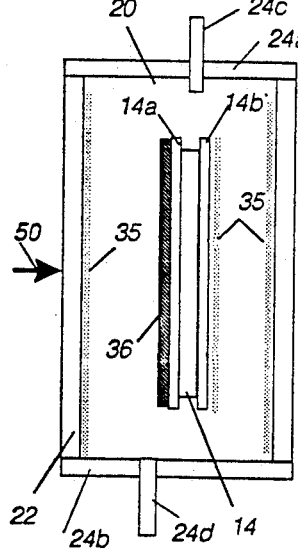
FIG. 3 is a schematic view of an embodiment of a liquid crystal (LC) projection array and an infrared absorbing and conductive cooling liquid cell assembly.

For dealing with long wavelength infrared ("far" infrared) the system includes a liquid filled cell 20 containing water and/or another appropriate fluid such as ethylene glycol. As seen in FIG. 3, the cell is formed of two parallel, spaced transparent walls 22 and 24 orthogonal to the beam axis. Side walls, not shown, and top and bottom plates 24a and 24b complete the enclosure. The liquid in cell 20 absorbs infrared energy from the beam 50, while providing excellent transmission characteristics at shorter, visible wavelengths.

Removal of heat from cell 20 is accomplished by circulating liquid through cell 20 via an inlet 24c and an outlet 24d, FIG. 3. These are connected in a line 31, FIG. 1, of a thermostatically-controlled liquid circulating system including a pump 25, flow control switch 30 and radiator 26. The latter may preferably be cooled by convection. A thermostatically-controlled, low-noise fan 28 located to avoid intrusive noise may be used for some applications.

The flow switch 30 may also be instrumented to sense the flow of liquid so that, should the pump fail or the system develop a leak, this condition may be sensed and signalled to an attendant. Alternatively, the sensed condition may cause the lamp 10 to be automatically extinguished to protect the array 14 and other optical devices before any thermal problems develop.

As a further measure, an expansion chamber may be provided as part of the circulation system which can be placed relatively remote from the cell to accommodate hydraulic pressure surges within the liquid system and thereby reduce the risk of leaks.

The coolant system which may employ ethylene glycol or a mixture of it and water, serves to prevent excessive temperatures in both the filtering liquid cell 20 and in the gate 4 immersed therein. A hot mirror 36 on the incident face of the gate provides additional temperature control. The assembly is also provided with anti-reflective coatings 35 on the interior of front window 22, back window 24 and the liquid interface of gate plate 14b to increase transmission efficiency.

ALTERNATE CELL/GATE CONSTRUCTION

Figure 5:
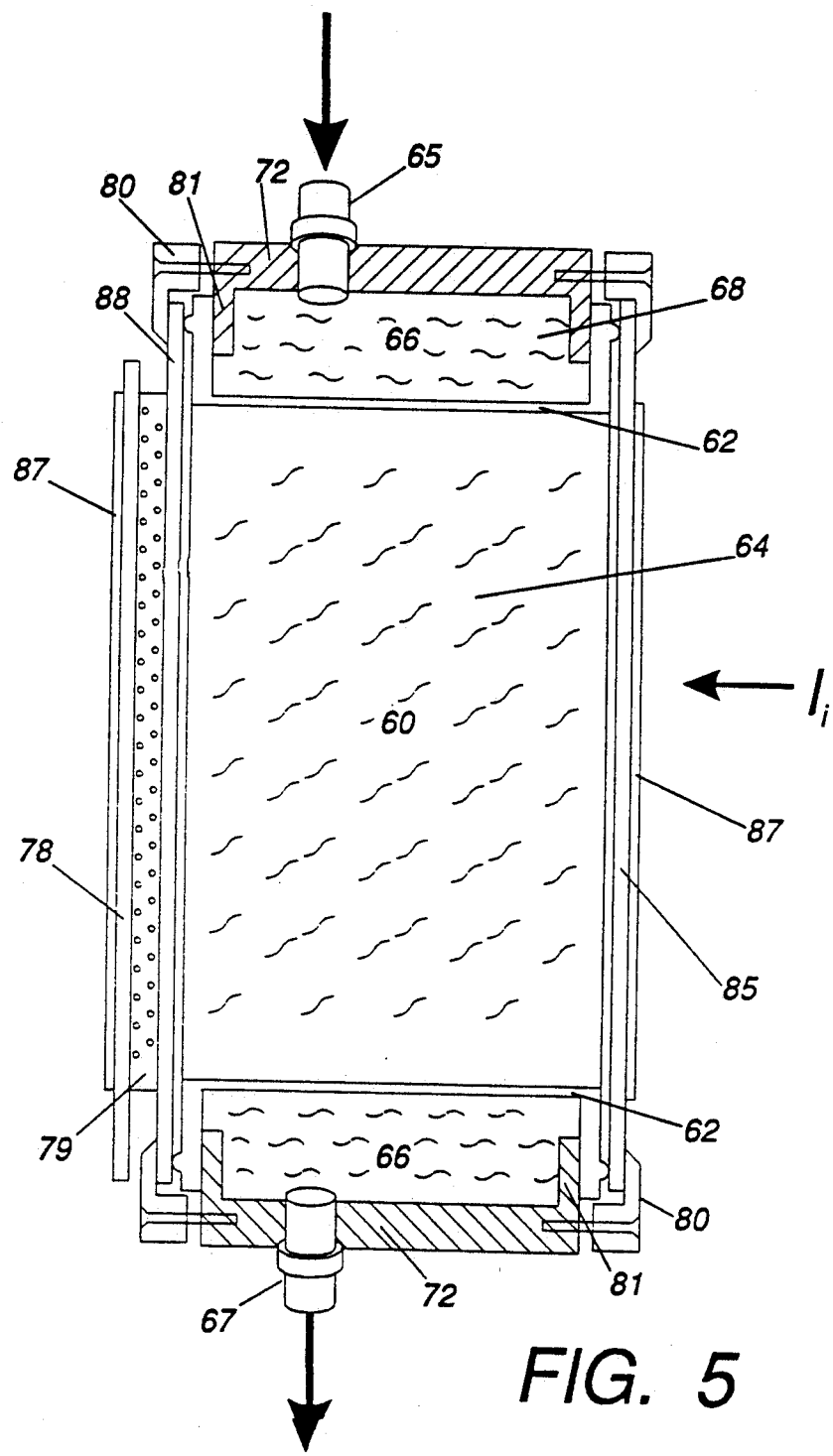
FIGS. 5 and 5A are schematic side sectional and perspective views, respectively, of an embodiment of the LC projection array and liquid cell assembly.
Figure 5A:
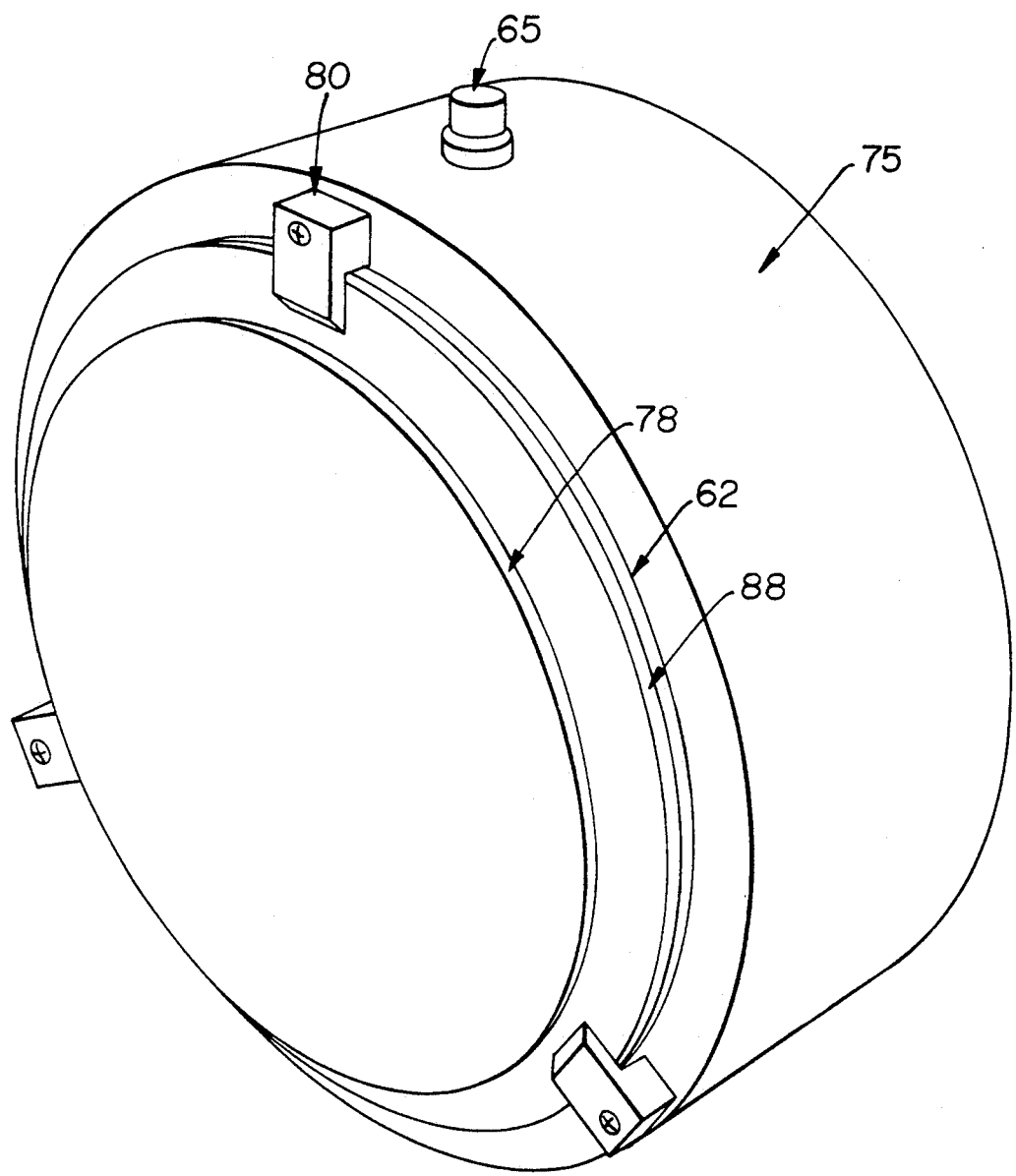

A preferred embodiment of the gate/liquid cell is shown in FIGS. 5 and 5A. It comprises a first sealed cylindrical chamber 60 for containing the infrared absorbing liquid 64, preferably optically clear ultra-pure water. A flanged cylindrical, flexible boot 62, preferably of silicon rubber, forms the peripheral boundary of a sealed chamber 60 having end faces formed by transparent front and rear windows 88 and 85. The silicon boot 62 provides for expansion and contraction as the water chamber volume varies with temperature.

The front and rear windows 88, 85 of the cell 60, clamped in place with the aid of retainer clips 80, may be comprised of a fused quartz material and are preferably of a minimum thickness consistent with structural needs.

Surrounding the filtering chamber 60 is a second annular chamber 66 suitable for containing a coolant 68, and providing for maximum heat transfer between the liquid 64 in the cell 60 and the coolant 68 in chamber 66. The coolant chamber 66 is defined by the cylindrical boot 62, forming its interior periphery and an outer cylinder 72, with flanges 81, as shown in FIG. 5. This arrangement provides a mechanism for the transfer of heat absorbed by the water 64 from the infrared absorbing process, out of the liquid cell chamber 60 transferred across the boot 62 boundary to the secondary fluid or coolant 68.

Means are provided for circulating the coolant 68 through the coolant chamber 66. For this purpose, the coolant is circulated through the chamber 66 by means of the input and output channels 65 and 67, the former being connected to the output of a radiator, such as 26, FIG. 1, so that the temperature of the liquid crystal display is maintained.

In addition to cooling the liquid cell, the coolant provides cooling of the projection gate array 79 having a front glass 78 and a rear glass 88. This is achieved by placing the matrix assembly in thermal contact with the liquid in the filtering chamber 60 thus accessing the coolant. To this end, the rear glass of the projection gate can be formed as the front window 88 of the liquid cell. Additionally, anti-reflective coatings 87 can be placed on the front and rear surfaces of the liquid cell/ projection gate assembly as shown in FIG. 5. This is done to minimize interface mismatches and thus reduce surface reflections as light passes from one medium to another.

The sealed nature of chamber 60 of the liquid cell minimizes turbulence and maintains the transparency of the water to preserve the clarity of an image formed in the beam by the liquid crystal array. When mounted in a panning and tilting head assembly suitable for use as an automated stage lighting instrument, the liquid subsystem will be filled to an extent to maintain the requisite clarity with no appreciable turbulence or bubbles within the cell.

Figure 6:
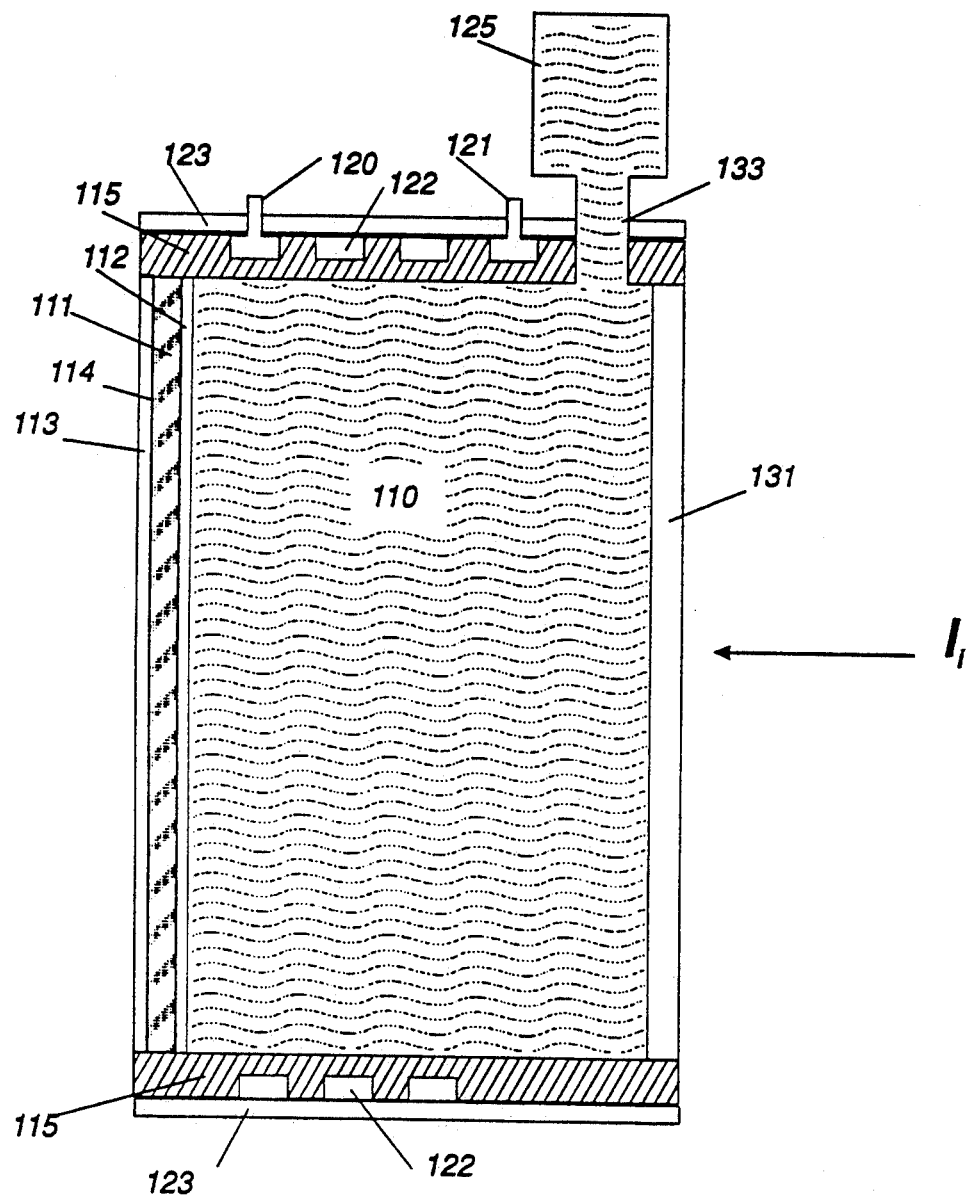
FIG. 6 is a schematic side sectional view showing an alternate embodiment of a LC projection array and liquid cell assembly.

An alternate embodiment of the gate/cell assembly is shown in FIG. 6. As illustrated, the infrared absorbing liquid is contained in a cylindrical enclosure 110 defined by a cylindrical peripheral wall 115 and transparent, planar front and rear windows 112 and 131. A helical channel is formed in cylindrical wall 115 and is covered by an outer sleeve 123 to define a coolant path 122 having inlet and outlet ports 120 and 121. The resultant coolant flow is designed to provide additional temperature stability.

Communicating with the chamber 110 is an expansion chamber 125 which includes a duct 133 extending into chamber 110.

The transparent face 112 of the unit includes a light scattering array 111 sandwiched between the transparent plates 112 and 113. The array may be of any of the forms previously described. The coolant in chamber 110 may be selected such that its index of refraction matches the index associated with the front and rear walls 112 and 131.

Figure 7:
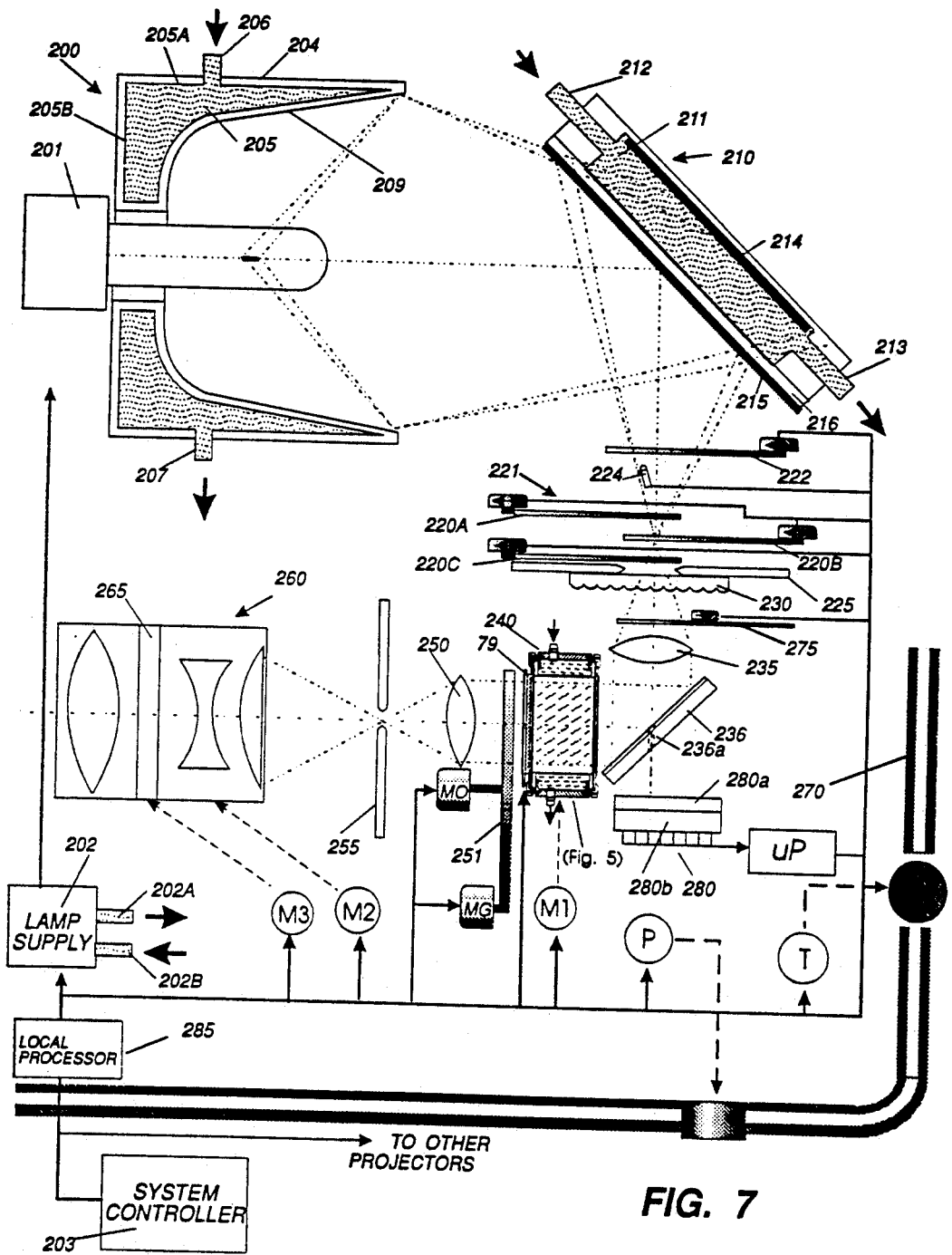
FIG. 7 is a schematic side elevation view of a part of the interior of a light projector showing the preferred optical system thereof.

The preferred embodiment of the optical system of the present invention is illustrated in FIG. 7. The disclosed "fold back mirror" assembly offers several benefits. In addition to solving problems of space constraints, this configuration offers additional surfaces which may be utilized by the infrared and ultraviolet filtering assembly. By applying "cold mirror" coatings to certain of the reflective surfaces, additional infrared energy may be removed from the beam of light.

In this embodiment, the projector lamp assembly 200 includes a lamp 201, such as a Phillips MSR series arc lamp, which is energized from a lamp supply 202 controlled via a local processor 285 from the system controller 203. These system components may be of the type shown in previously mentioned U.S. Pat. No. 4,980,806. The lamp supply 202 and other electronic components are cooled via coolant lines 202a and 202b connected to the coolant system.

Lamp 201 is mounted in a reflector assembly 204 having a reflective surface 209 and a coolant chamber 205 with an inlet 206 and outlet 207. Coolant is circulated through the chamber via these ports under control of the coolant system previously described.

As an alternate embodiment, the reflector assembly may have an exterior cold mirror coating on surface 209 and an infrared absorbing surface applied to the interior distal surfaces 205A and 205B of chamber 205. Infrared light incident on the cold mirror is transmitted through it and is then partially absorbed by the coolant in chamber 205 and partially by the infrared absorbing surface on its walls.

The beam projected from projection assembly 200 is incident on a cold mirror and liquid coolant unit 210 having an interior coolant chamber 211 which is connected to the coolant circulating system via inlet port 212 and outlet port 213.

The mirror includes a glass substrate 216 on which is deposited a multi-layer dielectric interference filter 215, which reflects light in the visible spectrum while passing infrared and ultraviolet wavelengths. Infrared energy passing through the filter 215 is partially absorbed by the coolant in chamber 211 and partially by the infrared absorbing surface 214 mounted on the back of the mirror assembly. This surface too is the beneficiary of the heat conduction provided by the circulated coolant. The ultraviolet energy is absorbed partially by the glass substrate 216.

The projected beam reflected from mirror unit 210 is converged on a color control assembly 221. Although arrays of liquid crystal pixels can be used to create multi-color projected images, relatively complex multi-path optical systems are normally required. To avoid this expense and complication and some of the tradeoffs it requires, it is preferred to generate a single color beam through the use of dichroic filters and to concentrate the resultant filtered monochromic (single color) light on the projection array. This approach is desirable because the combination of dichroic filter features (discussed in a following section) has been found to yield extraordinary color control.

Figure 8:
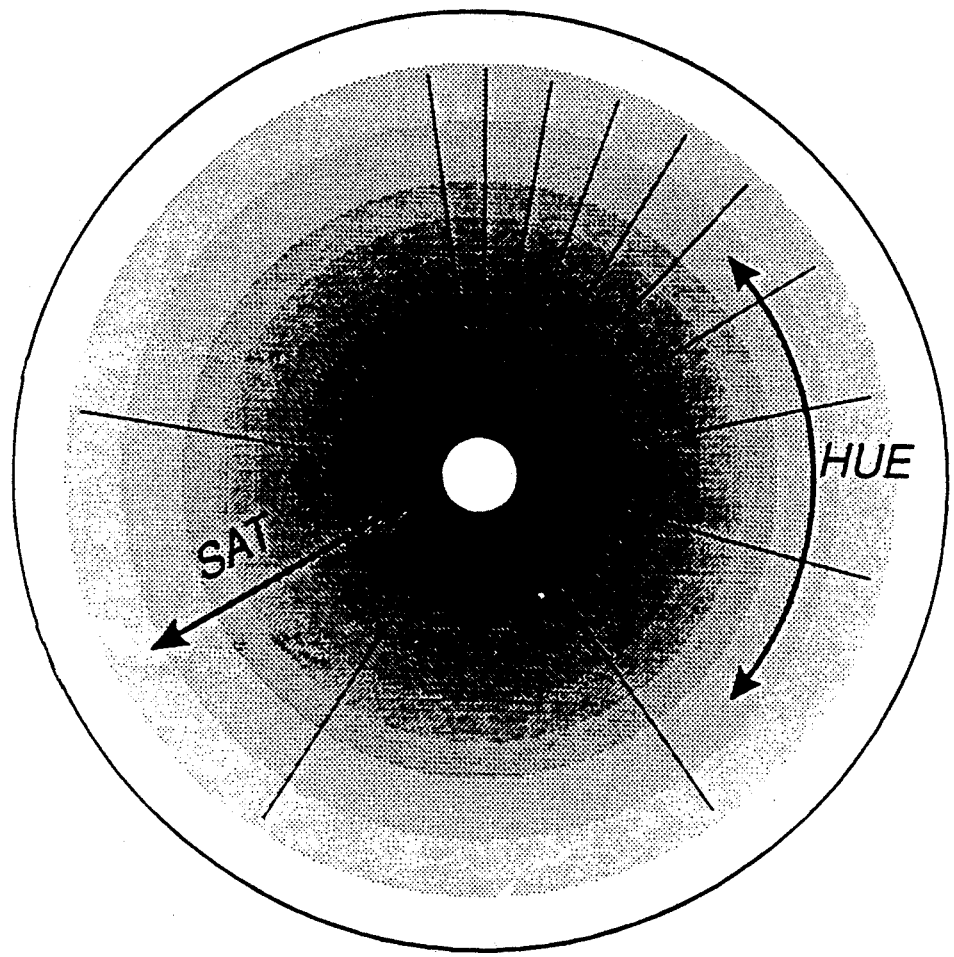
FIG. 8 is a plan schematic view which illustrates one of the color filters forming the color control system of the invention.

The color wheel assembly embodying these features includes three color wheels 220A, 220B and 220C that offer a continuous range of colors around their circumference (see also FIG. 8). Under control of the system controller 203, each of the three wheels may be rotated to a position corresponding to a particular set of color parameters. This permits smooth fades and other continuous variations not achievable in conventional assemblies, including variations in color center (hue) and color band width (saturation) of the light beam.

Each color wheel comprises a variable, all dielectric dichroic filter that allows light of particular bands of wavelengths (corresponding to particular colors) to pass while reflecting the light at other wavelengths. This variable thickness multi-layer optical thin film is designed to minimize absorbance and to operate at high optical power densities. Its composition includes layers of dielectric materials having different indices of refraction and thickness, these parameters being varied over the filter surface to produce continuously variable spectral responses.

Constructing the color wheels out of all dielectric materials provides significant benefits over metal-dielectric designs; namely, high power through-put with minimal absorbance and greatly enhanced environmental ruggedness. See "Optical Thin Films Users' Handbook" by James D. Rancourt, published by Macmillan, and in particular section, 3.7.3 and sections 4.4.2 through 4.4.5. Color wheels of the type described herein can be obtained from Optical Coating Laboratory Inc. of Santa Rosa, Calif.

Figure 9A:
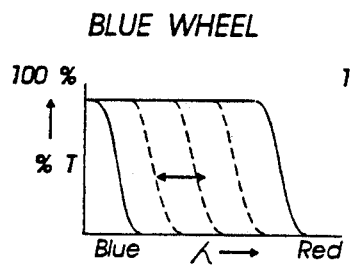
FIGS. 9A through 9G comprise a set of spectral transmission curves illustrating certain properties of the color wheel system of the invention.

The first color wheel 220A may be a variable short wave pass "edge" filter transmitting light of shorter wavelengths and attenuating light of longer wavelengths. As shown in FIG. 9A, this filter tends to pass light having "blue" wavelengths, and the cut-off wavelength can be variably extended continuously by rotating the wheel to a position having a different, e.g., longer cut-off wavelength such that the edge effectively slides along the wavelength axis, passing light having longer wavelengths (greens and reds).

Figure 9B:
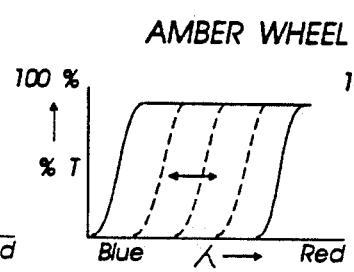

The second wheel 220B may be a variable long wave pass edge filter transmitting light of longer wavelengths and attenuating light of shorter wavelengths with a variable cut-off wavelength. As shown in FIG. 9B, this filter passes light having "red" or long wavelengths, and here too the cut-off wavelength can be continuously varied, e.g., by rotating the wheel to a position having a shorter cut-off wavelength such that it will pass light having shorter wavelengths (greens and blues).

Figure 9C:
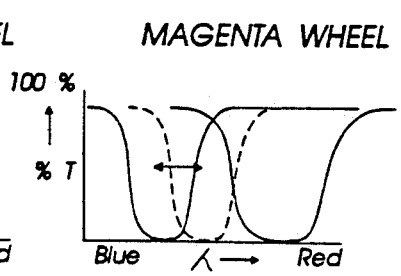

The third wheel 220C, may be a variable band-reject filter that will stop wavelengths within a band defined by a variable upper and lower wavelength, and will pass light outside of this wavelength band. As shown in FIG. 9C, as the third wheel is rotated the stop band effectively slides along the wavelength axis.

Figure 8A:
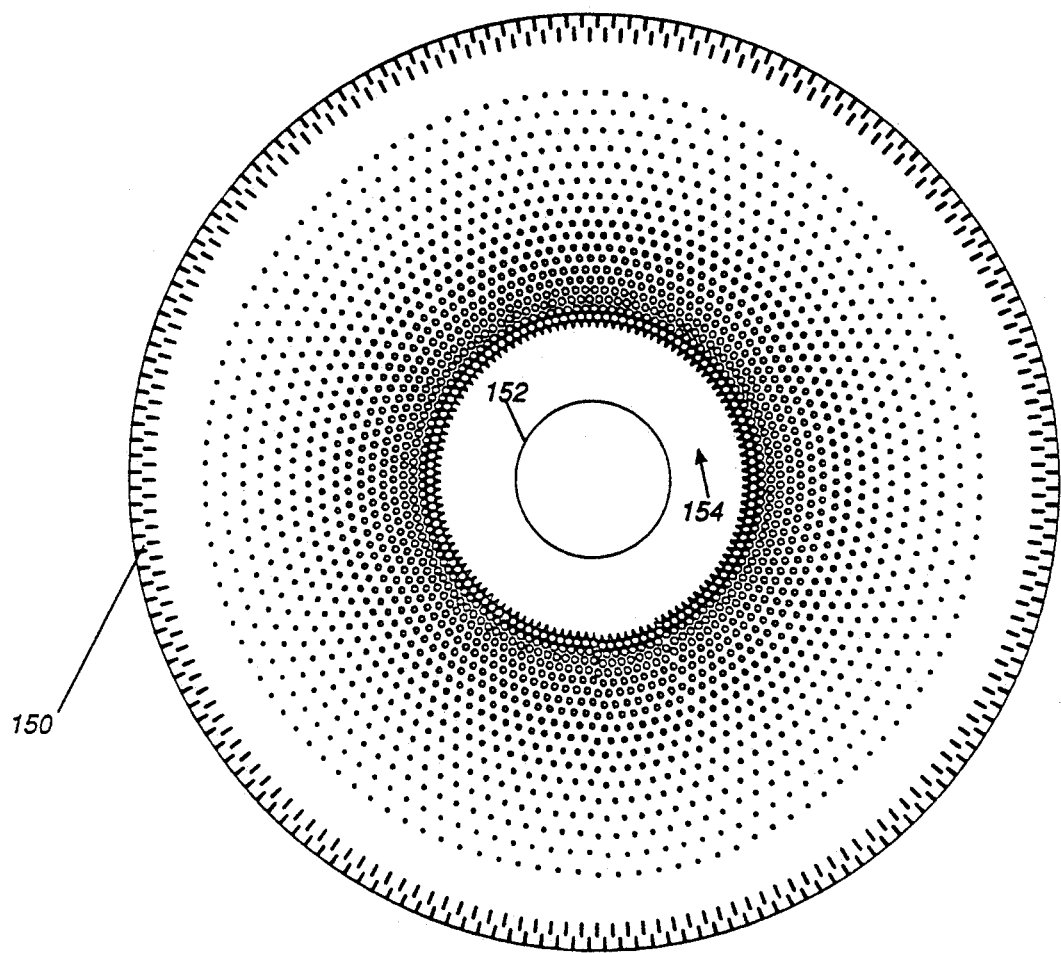
FIG. 8A is a plan schematic view which illustrates the dot density of the color filters forming the saturation control system of the invention.
Figure 9D:
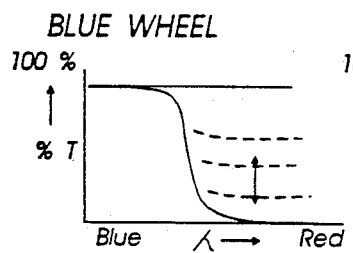
Figure 9E:
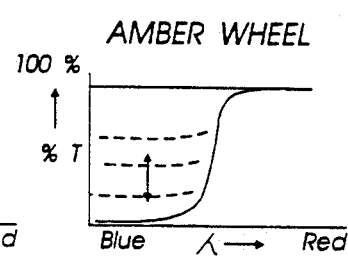
Figure 9F:
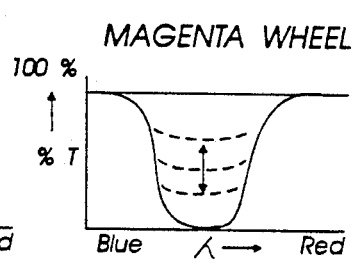

The three-wheel system constitutes a complex variable filter system that offers significant improvements in color control. As shown in FIGS. 9D, E and F, additional variations are obtained by controlling the color density, e.g., by a half tone, or dot density, or other technique, as shown in FIG. 8A, to provide continuously variable saturation radially from the inner region to the perimeter of each wheel, and by providing displacement means for progressively translating the color wheels out of the beam to expose these different saturation values to the beam. This feature, controlled by controller 203, FIG. 7, provides saturation control of the color whereby the ability to control the amount of white light that is mixed with the color is obtained.

In the preferred embodiment, the filters are continuously variable dichroic, all dielectric elements.

Figure 9G:
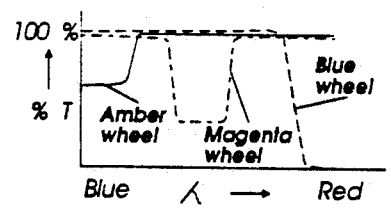

An illustrative combined effect of all three wheels is shown in FIG. 9G which depicts the remaining spectral energy after 3 stages of subtractive filtration of a white light beam.

Each of the three wheels can be fabricated from a disk having a circular aperture 152 in the center thereof, with a clear area 154 around the inner edge of the disk adjacent to the central aperture 152 as shown in FIG. 8A, the clear area 154 offering no color filtration. The wheels can be translated across the beam path to position the central aperture 152 in the beam path to eliminate color filtration, and to eliminate any light loss due to reflection or absorption. The wheels can also be translated across the beam path to position the color filter area corresponding to the desired level of color density or saturation in the beam path.

The areas of maximum saturation, being fabricated near the periphery of the color filter wheels (as shown in FIG. 8A), is positioned such that a light beam of a given diameter incident upon the wheel intercepts a portion of the color filter having a more narrow range of hue variation than a light beam of the same diameter incident upon a corresponding area of lesser saturation. Therefore, maximum saturation and minimum range of hue variation throughout the beam diameter is achieved near the periphery of the color filter wheel. Translating the color filter wheel across the beam path, such that the light beam intercepts the wheel at a position closer to the center of the wheel, increases both the amount of unfiltered light passing through clear regions formed by the dot density pattern, and increases the range of hue variation within the beam diameter as the beam subtends a greater angle upon the wheel, thereby decreasing the saturation of a given hue.

Each color filter wheel is further fabricated to include an encoder pattern 150 (FIG. 8A) at the periphery of the wheel. When read by an appropriate detector/decoder, the encoder pattern 150 enables detection of a change in angular position. A two-track quadrature encoder pattern as shown in FIG. 8A, when combined with an appropriate counter/timer circuit and an index point, allows local processor 285 to determine absolute angular position and rotational velocity from incremental angular position and direction of rotation signals. Alternatively, an absolute position encoding scheme would allow the local processor to determine absolute angular position and rotational velocity more directly by well-known techniques utilizing multiple sensors and multiple-bit digital encoding. Each color filter wheel may be mechanically coupled to a "rim-drive" arrangement acting upon the periphery of each wheel to control angular positioning of the wheel, as shown in FIG. 7.

Following the color control unit 221, along the optical path is a field stop 225 which blocks stray light. An optional integrating lens 230 homogenizes any color variation across the beam.

The beam then passes through a color wheel 275 (optional, discussed hereinafter) and then through a collimating lens 235 after which it is reflected from a folding mirror 236. This arrangement serves to direct substantially parallel light rays on the liquid crystal material of the projection array to maximize transmission efficiency and to achieve a suitable optical path profile. The mirror 236 can be in thermal contact with an additional cooling chamber (not shown) connected in the circulating system.

The preferred embodiment of the projection gate 240 is the LC array of FIG. 5. Additionally gate 240 may for some applications be moveable in and out of the light path under control of a solenoid or motor M1. This feature extends the lifetime of the LC array by removing it from the light path while not in use. Further, it reduces light loss when the projector is in other modes.

In certain applications, particularly when using crystal arrays of minimum resolution, dramatic visual effects can be achieved by the incorporation of a gobo wheel which modulates the beam along with the LC gate. For this purpose, the system may include gobo wheel 251 which via motor MG provides a number of fixed patterns or other optical effects arranged around a common axis and one of which is selected by rotating the motor MG under control of system controller 203. The selected pattern may further be rotated to a desired orientation within the beam by motor MO. Additionally, one of the positions of the gobo wheel presents a clear aperture to the beam. The gobo wheel 251 and the LC gate 240 can be used in combination with one another or independently from one another in modifying the beam for the formation of images. If the LC array is to be used alone, the gobo wheel is driven to its clear position. (Alternatively, it may be retracted away from the optical axis.) Similarly, if the gobo wheel is to be used alone, the LC array 14 is displaced out of the beam path.

Following image generation, the optical system includes a relay lens 250 and a contrast aperture 255. The contrast aperture stops all non-parallel light scattered by the projection gate that is incident on the relay lens to improve the contrast ratio of the projected image.

A zoom lens system 260 controlled via motor M2 is provided at the exit of the projector and is controlled by system controller 203 to provide focus and magnification selection. Additionally, an intensity control iris 265 may be incorporated in the system and controlled by the system controller 203 which drives motor M3. In some applications, a separate drive motor may be provided for each of the zoom elements.

The projection assembly is controlled in pan and tilt by the servo drives P and T. The assembly may be contained in a sealed housing 270. This technique helps to preserve the sterile environment of the projector and limits the noise that may be generated by various moving components. Further cooling can be accomplished by constructing the lamp housing 270 of the lighting system as a double wall system that carries coolant, acts as a heat sink that convects and radiates heat away from the projector.

INTENSITY CONTROL

Figure 8B:
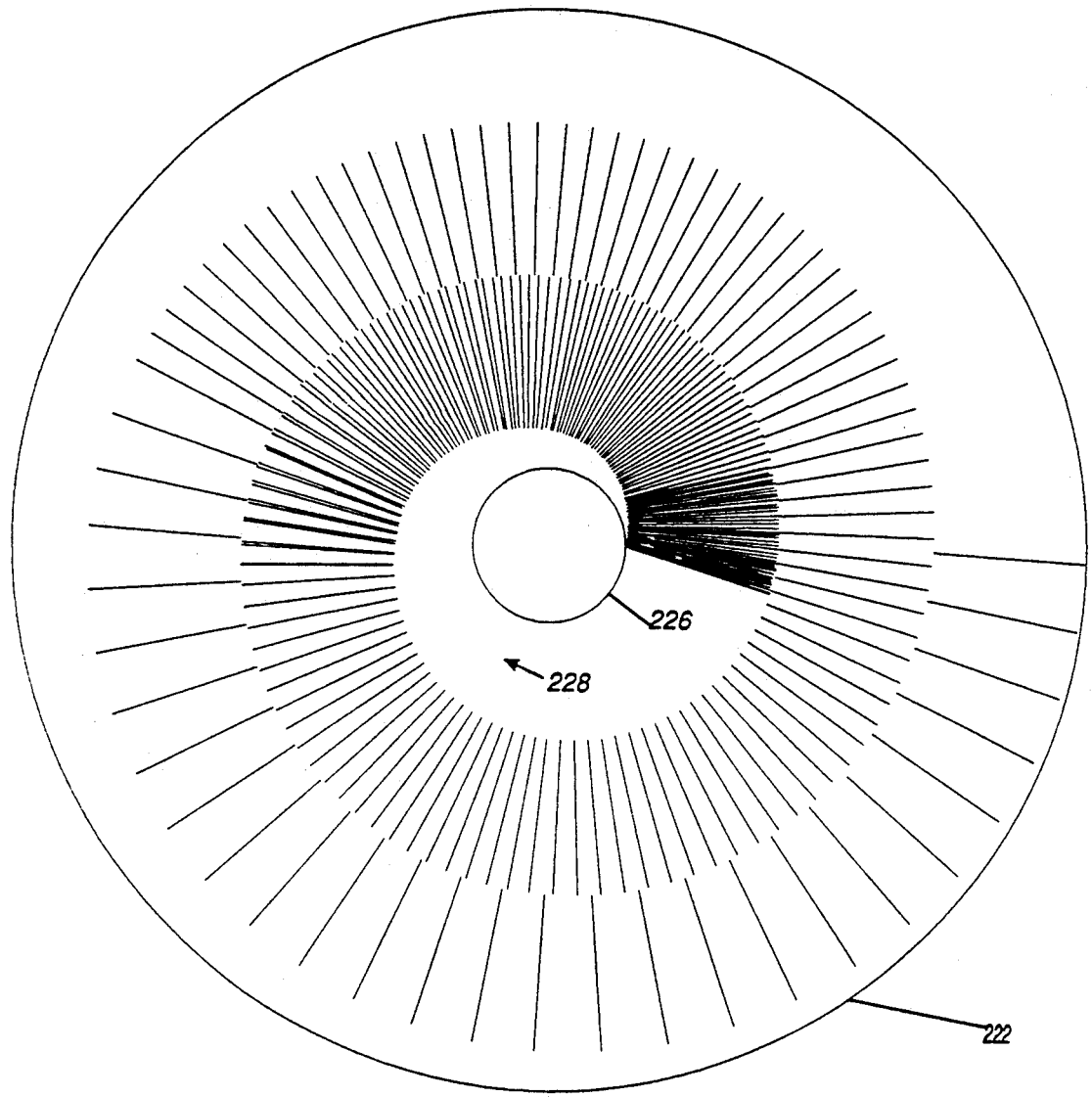
FIG. 8B is a plan schematic view which illustrates the spatially-modulated, variable-density, reflectively coated dimming wheel of the invention.

An alternate mechanical dimming means for controlling the intensity of the beam output may take the form of a transparent disk having a reflective coating whose reflectivity varies along an appropriate path on the disk. The reflectivity along the path is varied, for example, by varying the density of a dot pattern in the manner described with respect to FIG. 8A for color wheels 220A, 220B, and 220C. The density variation and its locus are preferably selected to achieve a smooth, linear change in intensity while also facillitating a quick transition from black-out to full brightness. Thus, as shown in FIG. 8B, the path may be in the form of a dimming wheel 222 having a spirally varying reflectivity. The wheel 222 may be fabricated to include a central aperture 226 for passing undimmed, full intensity light. The variable density dot pattern formed as a light-attenuating reflective coating may begin with a clear area adjacent the aperture 226, and proceed with increasing density, and therefore increasing reflectivity, in a spiral path toward the periphery of the wheel, as shown in FIG. 8B. The outer region, near the periphery of the wheel, reflects all of the light incident thereon, thereby dimming the beam to zero intensity.

By conjointly rotating the wheel and translating the wheel across the beam path, the beam is made to intercept the wheel at various points along the spiral path such that the intensity level can be smoothly controlled. Slow fades may be controlled very smoothly, especially at the low intensity end of the spiral path, owing to the gradual increase in the density of the reflective coating. Careful design of the dot pattern improves the linearity of a fade over what can be achieved with a dimming iris, since linear movement of an iris actuating arm produces non-linear change in intensity, especially as the iris approaches the zero-intensity or fully-closed end of travel.

By quickly translating the wheel across the beam path with little or no rotation of the wheel, the intensity level can be quickly changed from zero to full, or from full to zero, by bypassing the graduated density areas disposed along the spiral path. By following the spiral path, a controllable intensity ratio of up to 10,000:1 may be achieved.

The dimming wheel 222 is rotatable and translatable relative to the beam path. The dimming wheel 222 may be mechanically coupled to a "rim-drive" arrangement acting upon the periphery of the wheel to control angular positioning of the wheel, as shown in FIG. 7. Additionally, the dimming wheel can be fabricated to include an encoder pattern as discussed with respect to color filter wheels 220A, 220B, and 220C. In this manner, when the encoder pattern is read by an appropriate detector/decoder, the encoder pattern enables detection and processing of a change in angular position.

Alternatively, the dimming means may be formed on a linear strip having a reflective coating whose reflectivity varies along its length. The reflectivity of the linear strip is varied by varying the density of a dot pattern in the manner described above. The linear strip provides a smooth, linear change in intensity as it is moved laterally across the beam path By making use of a suitable durable flexible substrate, the linear strip dimming means could be wound upon two spools disposed on either side of the beam path. Thereafter, the dimming strip may be rolled or un-rolled across the beam path to control the output intensity of the luminaire.

INTENSITY FEEDBACK

A light-sensitive electrical device, such as a photo diode or other suitable transducer can be used to sample the beam after it has been subjected to dimming by an intensity control mechanism, and provides intensity feedback signals to the local processor 285 for intensity control. In one embodiment, shown in FIG. 7, the intensity feedback device 224 is positioned to sample the intensity of light after the intensity control wheel 222. The intensity feedback arrangement allows a luminaire to produce a specified level of illumination. Intensity feedback may be selectively disabled in the operating system software controlling the local processor, for example in instances in which the feedback sensor might be in the shadow of a gobo or other projected image.

COLOR MATCHING

A problem which arises in some applications involves color mismatch between luminaires. Lamp color calibration can vary with lamp type and can also change with time making it difficult to achieve precise color match among the luminaires of a system. To address this problem, the system according to the invention includes a color sensor or spectrum analyzer 280 for quantifying beam color. It is implemented with a linear variable filter 280a, FIG. 7, which is located to sample the beam after it has been subjected to coloring by the beam color system 221. For this purpose, it may be located to receive a sampled portion of the beam which passes through an aperture 236a of mirror 236.

The linear variable filter, which may be of the type marketed by Optical Coating Laboratory, Inc. under the mark Selectraband (TM), provides a band pass filter having a center frequency which varies linearly with spatial positioning. It can be combined with a suitable ic photo diode array 280b to produce a composite signal indicative of the beam's spectrum. This output can be processed as closed loop feedback, for example, by a local dedicated microprocessor Up or shared microprocessor 285 which can also supply the measured color data to the system controller. The local or remote color controller circuits of the system can thus control the color system to produce a specific color condition. This provides the means for obtaining absolute color accuracies of the projected beams and also enables compensation for differences in the light source. Each luminaire is thus able to reproduce a desired color more precisely, even if the spectral output of the light source changes over time. A group of several luminaires is also able to reproduce the same color more accurately, even if the spectral output of the several light sources varies from source to source at a given moment.

ADDITIONAL SEQUENTIAL COLOR SYSTEM

If real-time full color images are desired, they may be obtained with the present single-path optical system by sequentially illuminating the projection array with a plurality of primary colors, e.g. red, green and blue. A monochrome system normally utilizes a frame rate of approximately 25 to 30 images per second to achieve the illusion of continuous motion with virtually no flicker. In order to obtain sequential full-color operation, the frame rate of the present system is increased to three times the flicker rate, with each frame consisting of three image fields, one for each of the three primary colors (e.g., red, green and blue).

During each frame, the projection array, e.g., array 79 of FIG. 5, is addressed with the video information corresponding to the image field for the first of the primary colors and is then illuminated with that selected primary color. As a result, the projection array will project the video information for the image field of the first primary color during a first interval of the frame period. Thereafter, during a second interval, the projection array is addressed with the video information corresponding to the next image field and the array is illuminated with the light for the second primary color. This process is then repeated for the third primary color. According to this procedure, the red, green and blue image fields are projected in sequence for each frame. The full color moving image results as the human eye integrates each of the primary colors together.

To obtain each of the primary colors required for sequential full-color operation, a dedicated tri-color wheel assembly 275, FIG. 7, can be included in the color control unit. Each sector of the wheel 275 is a dichroic filter that passes light of certain wavelengths, corresponding to a desired color. The dedicated color wheel can serve to simplify the color filtration operation necessary in achieving a sequential full color system. Similar to the operation of the three color wheels 220A, 220B, 220C disclosed above, the dedicated tri-color wheel 275 can be translatable out of the optical path to eliminate color filtration. (Note also that a white beam of ⅓ brightness could be obtained by spinning the wheel and not modulating the gate. Further, when a single color beam is needed, e.g., blue, the sequential system will have an intensity ⅓ that of a dedicated filter system). A sequential color liquid crystal display system is found for example in U.S. Pat. No. 4,843,381 issued in the name of Yair Baron.

PROGRAMMABLE ROTATABLE GOBO WHEEL

Figure 10:
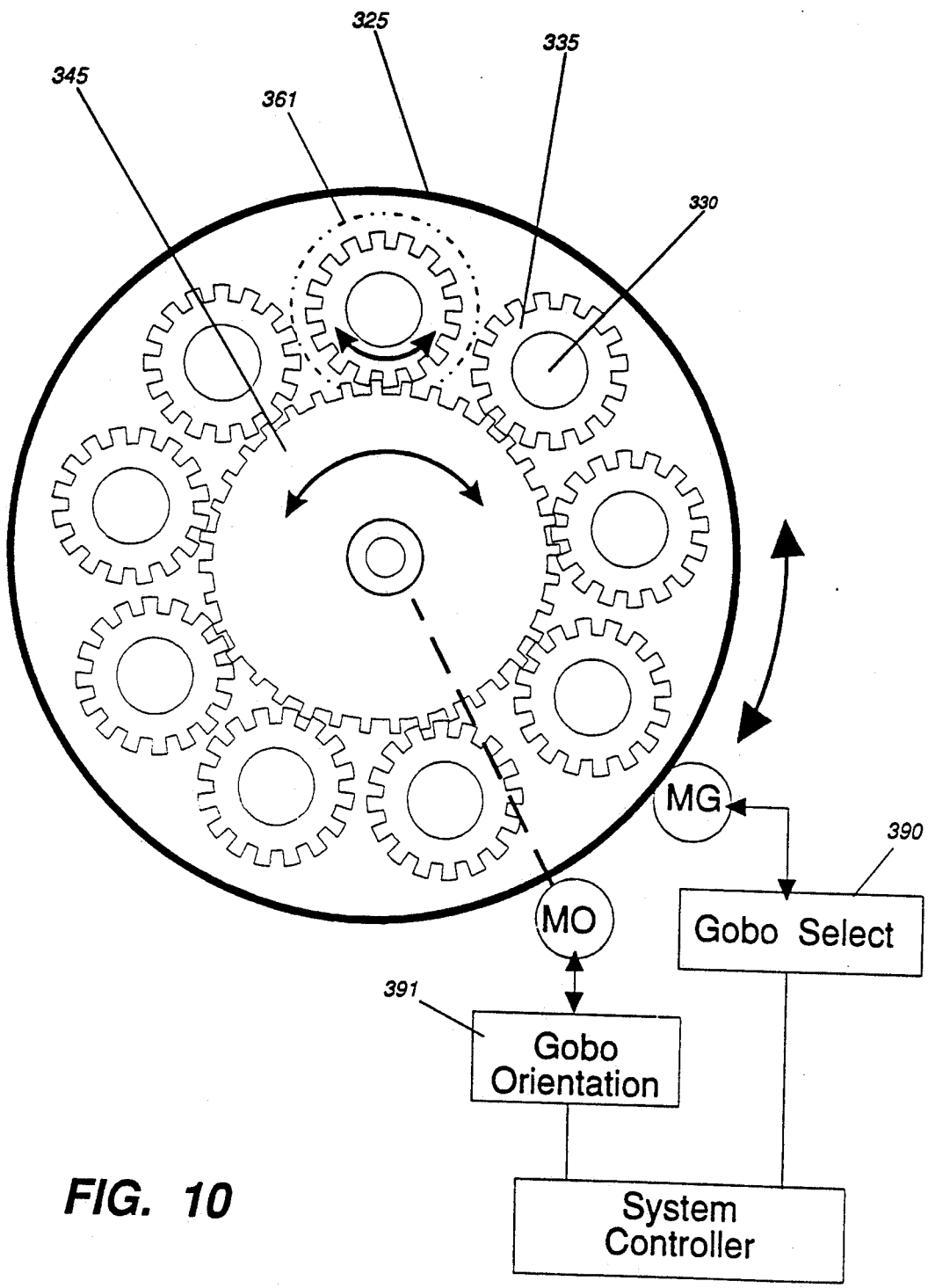
FIG. 10 is a schematic plan view of an alternate embodiment of a programmable rotatable gobo wheel assembly.

A preferred embodiment of the gobo wheel 251, discussed with respect to FIG. 10, offers improvements in the automated orientation of gobo patterns. To this end, a gobo carrier 325 supporting a set of individual gobo units 330 about its periphery may be rotated by a motor MG controlled by a Gobo Select System 390 to position a selected one of the gobos 330 at a site 361 within the path of the light beam passing through the gobo assembly.

Carrier 325 may be controlled by an open or closed loop analog, digital or hybrid motor control system which is constructed and controlled by the lamp mechanisms and lighting controller of previously cited U.S. Pat. No. 4,980,806.

The orientation of each gobo unit 330 is also variable and adjustable. For this purpose, the gobo wheel assembly 325 includes a sun gear 345 which engages gobo gears 335 incorporated around the periphery of each gobo unit. Sun gear 345 is controlled by a Gobo Orientation Controller 391. It too may embody any of the drive systems used in the Gobo Select System. In either or both systems, position, velocity and related parameters such as acceleration may be utilized.

Since the sun gear 345 engages all gobo gears 335 all the time, rotating any one gobo causes all gobos to rotate. By rotating gobo carrier 325 and sun gear 345 at the same time and by different numbers of degrees of angular displacement, any selected gobo can be rotated by the sun gear to a desired orientation as it is being placed in projection gate site 361 by the gobo carrier. The selected gobo can further be rotated continuously or intermittently as desired while in the projection gate. The speed and direction of rotation of a gobo can also be controlled.

At least one orientation of the sun gear relative to the gobo carrier will result in the gobo which is positioned in the projection gate being in an "upright" orientation. In a preferred embodiment, there will be at least as many such orientations of sun gear relative to gobo carrier resulting in upright orientations of the gobos as there are gobos, achieved by careful selection of gear ratios between sun gear and gobo gears. All of the gobos can be installed while the sun gear and gobo carrier are fixed in one such orientation so that subsequently the orientation of the gobos may be accurately and predictably controlled. When the gobo carrier and sun gear are rotated by an equal number of degrees of angular displacement and in the same direction of rotation, gobos are exchanged with the upright orientation maintained. By rotating the sun gear a certain number of degrees relative to the gobo carrier, the orientations of the gobos are altered a corresponding number of degrees. By rotating the sun gear a certain number of degrees more or less than the gobo carrier is rotated, gobos are exchanged and their orientation altered at the same time. Alternatively, by careful selection of gear ratios between sun gear and gobo gears, the gobo carrier may be rotated while the sun gear is held motionless, and the selected gobo "rolls" into position assuming the desired orientation as it comes to rest in the projection gate. With speed control applied to the motor MG, the "rolling" effect may be used to creative advantage in the design of animated lighting effects.

The disclosed gobo assembly and system offers accurate, flexible and independent control of a wide range of beam pattern effects, both static and dynamic for incorporation in lighting cues. By selecting continuous or intermittent gobo rotation unusual and dramatic visual effects can be achieved.

What is claimed is:

1. A light projection system for lighting applications having one or more light projectors which include image forming means, said one or more projectors comprising:
    (1) a light beam source for generating an unpolarized light beam having an intensity suitable for lighting applications;
    (2) a projection gate located to modulate said unpolarized light beam and having an addressable array of light scattering liquid crystal pixels in an essentially non-absorptive optical environment, said pixels being capable of assuming transparent and opaque states;
    (3) an active heat control system for protecting said array of liquid crystals from the heat generated by said beam; and
    (4) a source of image control signals connected to said array to control the states of said pixels to vary the image projected by said beam.

2. A system according to claim 1 including an essentially sealed housing enclosing said light projectors.

3. A light projection system according to claim 1 in which said active heat control system is thermostatically-controlled.

4. A light projection system according to claim 1 in which said light beam source has a power rating of about 1000 Watts.

5. A light projection system according to claim 1 in which said light beam source has a power rating greater than about 300 Watts.

6. An image projection system comprising:
    (1) a high intensity light beam source for generating an unpolarized light beam;
    (2) a beam modulation system including an addressable array of light scattering liquid crystal pixels in an essentially non-absorptive optical environment, said pixels being capable of assuming transparent and opaque states and positioned to modulate said unpolarized light beam;
    (3) an active heat control system for protecting said array of liquid crystals from the heat generated by said beam, said heat control system including heat transfer means in a thermally conductive relationship with said array; and
    (4) a source of image control signals connected to said array to control the transmission states of said pixels to thereby vary the image projected by said beam.

7. A system according to claims 1 or 6 including beam color control means for controlling the color of the beam modulated by said liquid crystal array.

8. A system according to claims 1 or 6 in which said heat control system includes a liquid cell.

9. A system according to claims 1 or 6 in which said system includes means for diverting radiant energy in the infrared range or the ultraviolet range from said array.

10. A system according to claims 1 or 6 in which said system includes a dielectric interference filter having dichroic properties for protecting said array for potentially damaging radiant energy.

11. A system according to claims 1 or 6 including a hot mirror positioned between said beam source and said array.

12. A system according to claims 1 or 6 in which at least certain of said liquid crystal pixels comprise nematic liquid crystal materials dispersed in a polymer matrix.

13. A system according to claims 1 or 6 including a folded optical system to reverse the direction of said beam.

14. A system according to claims 1 or 6 in which said heat control means includes a liquid circulations system.

15. A system according to claims 1 or 6 in which said liquid crystal pixels comprise liquid crystal material selected from the group comprising polymer dispersed liquid crystals, nematic curvilinear aligned phase liquid crystals, liquid crystal polymer composites, and polymer network liquid crystals.

16. A system according to claims 1 or 6 in which said heat control system does not depend on forced air circulation whereby silent operation is achieved.

17. A system according to claims 1 or 6 including a programmable gobo control system for imposing additional modulation of said beam.

18. A system according to claims 1 or 6 in which the transparency of said liquid crystal pixels can be adjusted over a range of values to provide gray scale effects.

19. A system according to claims 1 or 6 including:
(1) a carrier for supporting a plurality of gobos;
(2) means for controlling said carrier to position one of said gobos in said beam; and
(3) means for varying the angular orientation, velocity, and direction of a selected gobo, whereby the generated beam pattern can be adjusted by both gobo pattern selection and orientation of the selected gobo.

20. A system according to claims 1 or 6 which said array includes an active matrix coupled to said source of image control signals.

21. An image projection system according to claim 6 in which said active heat control system is thermostatically-controlled.

22. An image projection system according to claim 6 in which said light beam source has a power rating of about 1000 Watts.

23. An image projection system according to claim 6 in which said light beam source has a power rating greater than about 300 Watts.

24. A light projection system for lighting applications having one or more light projectors which include image forming means, said one or more projectors comprising:
(1) a light beam source for generating a beam having an intensity suitable for lighting applications;
(2) a projection gate located to modulate said beam and having an addressable array of light scattering liquid crystal pixels in an essentially non-absorptive optical environment, said pixels being capable of assuming transparent and opaque states;
(3) a heat control system for protecting said array of liquid crystals from heat generated by said beam;
(4) a source of image control signals connected to said array to control the states of said pixels to vary the image projected by said beam;
(5) a primary color generator for filtering said beam to repetitively produce three primary colors in succession for illuminating said array; and
(6) means for controlling said liquid crystal pixels to produce video images corresponding to each of said primary colors in synchronism with the illumination of said array with said primary colors, whereby said beam is modulated with said colored video images.

25. An image projection system comprising:
(1) a high intensity light beam source for generating a beam;
(2) a beam modulation system including an addressable array of light scattering liquid crystal pixels capable of assuming transparent and opaque states and positioned to modulate unpolarized light transmitted in said beam;
(3) a heat control system for protecting said array including a heat sink in thermally conductive relationship with said array;
(4) a source of image control signals connected to said array to control the states of said pixels to thereby vary the image projected by said beam;
(5) a primary color generator for filtering said beam to repetitively produce three primary colors in succession for illuminating said array; and
(6) means for controlling said liquid crystal pixels to produce video images corresponding to each of said primary colors in synchronism with the illumination of said array with said primary colors, whereby said beam is modulated with said colored video images.

26. A light projection system for lighting applications having one or more light projectors which include image forming means, said one or more projectors comprising:
(1) a light beam source for generating a beam having an intensity suitable for lighting applications;
(2) a projection gate located to modulate said beam and having an addressable array of light scattering liquid crystal pixels in an essentially non-absorptive optical environment, said pixels being capable of assuming transparent and opaque states;
(3) a heat control system for protecting said array of liquid crystals from heat generated by said beam;
(4) a source of image control signals connected to said array to control the states of said pixels to vary the image projected by said beam; and
(5) a color control system for adjusting the color of said beam, said color control system including a plurality of cooperating dichroic filter elements, each of said elements having adjustable filter characteristics capable of selective positioning in said beam.

27. An image projection system comprising:
(1) a high intensity light beam source for generating a beam;
(2) a beam modulation system including an addressable array of light scattering liquid crystal pixels capable of assuming transparent and opaque states and positioned to modulate unpolarized light transmitted in said beam;
(3) a heat control system for protecting said array including a heat sink in thermally conductive relationship with said array;
(4) a source of image control signals connected to said array to control the states of said pixels to thereby vary the image projected by said beam; and (5) a color control system for adjusting the color of said beam, said color control system including a plurality of cooperating dichroic filter elements, each of said elements having adjustable filter characteristics capable of selective positioning in said beam.

28. A light projection system for lighting applications having one or more light projectors which include image forming means, said one or more projectors comprising:
(1) a light beam source for generating a beam having an intensity suitable for lighting applications;
(2) a projection gate located to modulate said beam and having an addressable array of light scattering liquid crystal pixels in an essentially non-absorptive optical environment, said pixels being capable of assuming transparent and opaque states;
(3) a heat control system for protecting said array of liquid crystals from heat generated by said beam, said heat control system including a liquid cell having a flexible membrane separating a sealed inner chamber from an outer chamber through which fluid coolant is circulated; and
(4) a source of image control signals connected to said array to control the states of said pixels to vary the image projected by said beam.

29. An image projection system comprising:
(1) a high intensity light beam source for generating a beam;
(2) a beam modulation system including an addressable array of light scattering liquid crystal pixels capable of assuming transparent and opaque states and positioned to modulate unpolarized light transmitted in said beam;
(3) a heat control system for protecting said array including a liquid cell having a flexible membrane separating a sealed inner chamber from an outer chamber through which fluid coolant is circulated; and
(4) a source of image control signals connected to said array to control the states of said pixels to thereby vary the image projected by said beam.

30. A light projection system for lighting applications having one or more light projectors which include image forming means, said one or more projectors comprising:
(1) a light beam source for generating an unpolarized light beam having an intensity suitable for lighting applications;
(2) a projection gate located to modulate said unpolarized light beam and having an addressable array of light scattering liquid crystal pixels in an essentially non-absorptive optical environment, said pixels being capable of assuming transparent and opaque states;
(3) a lamp enclosure for containing said light beam source and projection gate;
(4) a heat control system for protecting said array of liquid crystals from heat generated by said beam, said heat control system including a liquid cell in thermal contact with said array of liquid crystals, said liquid cell containing fluid coolant;
(5) a source of image control signals connected to said array to control the states of said pixels to vary the image projected by said beam; and
(6) a liquid circulation system for circulating said fluid coolant between said liquid cell and a radiator having a portion extending outside of said lamp enclosure for transferring said heat outside of said lamp enclosure.

31. A light projection system for lighting applications having one or more light projectors which include image forming means, said one or more projectors comprising:
(1) a light beam source for generating an unpolarized light beam having an intensity suitable for lighting applications;
(2) a housing for enclosing said light beam source, said housing having a light opening for allowing the projection of said light beam;
(3) a color control system for adjusting the color of said beam;
(4) a projection gate interposed between said color control system and said light opening, said projection gate modulating said unpolarized colored light beam and having an addressable array of monochromic light scattering liquid crystal pixels in an essentially non-absorptive optical environment, said pixels being capable of assuming transparent and opaque states;
(5) a heat control system for protecting said array of liquid crystals from heat generated by said beam; and
(6) a source of image control signals connected to said array to control the states of said pixels to vary the image projected by said beam.

32. The light projection system according to claim 31 in which said color control system includes a plurality of cooperating dichroic filter elements, each of said elements having adjustable filter characteristics capable of selective positioning in said beam.

* * * * *